(12) United States Patent
Arthur et al.

(10) Patent No.: US 10,784,505 B2
(45) Date of Patent: Sep. 22, 2020

(54) AIR STABLE LITHIUM SULFIDE CATHODE COMPOSITIONS, METHODS FOR PRODUCING THEM, AND SOLID-STATE LITHIUM BATTERIES INCORPORATING THE SAME

(71) Applicant: Toyota Motor Engineering & Manufacturing North America, Inc., Plano, TX (US)

(72) Inventors: Timothy S. Arthur, Ann Arbor, MI (US); Patrick J. Bonnick, Ann Arbor, MI (US); John Muldoon, Saline, MI (US); Erika Nagai, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 68 days.

(21) Appl. No.: 16/059,641

(22) Filed: Aug. 9, 2018

(65) Prior Publication Data

US 2020/0052285 A1     Feb. 13, 2020

(51) Int. Cl.
*H01M 4/13*       (2010.01)
*H01M 4/1397*    (2010.01)
(Continued)

(52) U.S. Cl.
CPC ....... *H01M 4/1397* (2013.01); *H01M 4/0404* (2013.01); *H01M 4/622* (2013.01); *H01M 10/0525* (2013.01)

(58) Field of Classification Search
CPC .. H01M 4/1397; H01M 4/0404; H01M 4/622; H01M 10/0525
See application file for complete search history.

(56) References Cited

U.S. PATENT DOCUMENTS

| | | | |
|---|---|---|---|
| 2014/0370398 A1* | 12/2014 | Lee | H01M 4/5815 429/322 |
| 2016/0049655 A1* | 2/2016 | Fasching | H01M 4/582 429/221 |

(Continued)

OTHER PUBLICATIONS

Tatsumisago et al., "Recent Development of Sulfide Solid Electrolytes and Interfacial Modification for All-Solid-State Rechargeable Lithium Batteries," Journal of Asian Ceramic Societies, vol. 1, 17-25 (2013).

(Continued)

*Primary Examiner* — Jane J Rhee
(74) *Attorney, Agent, or Firm* — Christopher G. Darrow; Darrow Mustafa PC

(57) ABSTRACT

A lithium sulfide ($Li_2S_w$)-lithium phosphorus sulfide ($Li_xP_yS_z$) composite, electrochemical cells comprising the same, and methods for making the same are described herein. By the mechanochemical method described herein, the $Li_2S_w$—$Li_xP_yS_z$ composite can be formed and used as the active material in a positive electrode for a variety of electrochemical cells. It is shown herein that the composite is an electrochemically active cathode material. Further, it has been shown that the $Li_2S_w$—$Li_xP_yS_z$ composite shows increased resistance to decomposition and $H_2S$ generation than $Li_2S$.

18 Claims, 9 Drawing Sheets

(51) Int. Cl.
*H01M 4/04* (2006.01)
*H01M 4/62* (2006.01)
*H01M 10/0525* (2010.01)

(56) References Cited

U.S. PATENT DOCUMENTS

2017/0133719 A1   5/2017   Kwon et al.
2017/0309915 A1   10/2017   Lee et al.

OTHER PUBLICATIONS

Lin et al., "Phosphorous Pentasulfide as a Novel Additive for High-Performance Lithium-Sulfer Batteries," Wiley Online Library, vol. 23, Issue 8, 1064-1069 (2013).
Ulvestad, "A Brief Review of Current Lithium Ion Battery Technology and Potential Solid State Battery Technologies," https://arxiv.org/abs/1803.04317 (accessed Jul. 3, 2018).
Kerman et al., "Practical Challenges Hindering the Development of Solid State Li Ion Batteries," Journal of the Electrochemical Society, vol. 164, Issue 7, A1731-A1744 (2017).
Sun et al., "Recent Advances in All-Solid-State Rechargeable Lithium Batteries," Nano Energy, vol. 33, 363-386 (2017).

* cited by examiner

AIR STABLE LITHIUM SULFIDE CATHODE COMPOSITIONS, METHODS FOR PRODUCING THEM, AND SOLID-STATE LITHIUM BATTERIES INCORPORATING THE SAME

TECHNICAL FIELD

The subject matter described herein generally relates to lithium batteries and, more particularly, to air stable lithium cathodes.

BACKGROUND

In recent years, information-related devices and communication devices such as personal computers, video cameras, and portable telephones are rapidly spreading. As such, the development of batteries used as power supplies for said devices has increased in value. Further, also in an automobile industry and so on, batteries for electric automobiles or hybrid automobiles, which have high output and high capacity, are under development. At the present time, among various kinds of batteries, lithium batteries are under attention from the viewpoint of high energy density.

All-solid-state lithium batteries in which a solid electrolyte layer is used in place of the electrolytic solution do not contain flammable organic solvents. The all-solid-state lithium batteries are thus considered to provide benefit in production costs and productivity. Capacity density is also a consideration in solid-state batteries, and higher capacity densities can provide benefit for a variety of applications. The lithium sulfur (Li—S) battery has been considered for automobile applications. The theoretical energy density of a Li—S battery is 2600 Wh/kg, which is much higher than that of a Li-ion battery (510 Wh/kg). However, practical use of the Li—S battery is constrained by decreased efficiency when exposed to air.

SUMMARY

Disclosed herein is a lithium sulfide ($Li_2S_w$)-lithium phosphorus sulfide ($Li_xP_yS_z$) composite which can be used as part of an electrochemical cell, such as for an active material in the cathode. In one embodiment, a lithium sulfur-lithium phosphorus sulfur composite is disclosed. The lithium sulfur-lithium phosphorus sulfur composite can include a lithium sulfide material having an empirical formula of $Li_2S_w$, wherein w is from 2 to 20. The lithium sulfur-lithium phosphorus sulfur composite can further include a lithium phosphorus sulfide material having an empirical formula of $Li_xP_yS_z$, wherein x is from 2 to 20, y is from 2 to 20, and z is from 2 to 20.

In another embodiment, a lithium solid-state battery is disclosed. The lithium solid-state battery can include a positive electrode active material layer containing a positive electrode active material. The positive electrode active material can include a lithium sulfur-lithium phosphorus sulfur composite. The lithium sulfur-lithium phosphorus sulfur composite can include a lithium sulfide material having an empirical formula of $Li_2S_w$, wherein w is from 2 to 20. The lithium sulfur-lithium phosphorus sulfur composite can further include a lithium phosphorus sulfide material having an empirical formula of $Li_xP_yS_z$, wherein x is from 2 to 20, y is from 2 to 20, and z is from 2 to 20. The lithium solid-state battery can further include a negative electrode active material layer containing a negative electrode active material. The lithium solid-state battery can further include a solid electrolyte layer disposed between the positive electrode active material layer and the negative electrode active material layer.

In another embodiment, a method for producing a positive electrode active material is disclosed. The method can include creating a lithium sulfur mixture by combining lithium sulfide and atomic sulfur. The method can further include mixing the lithium sulfur mixture by a mechanochemical process, the mechanochemical process producing a lithium sulfide material. The method can further include adding a lithium phosphorus sulfur compound to the lithium sulfide material to create a lithium phosphorus sulfur mixture. The method can further include mixing the lithium phosphorus sulfur mixture by a mechanochemical process, the mechanochemical process producing a composite comprising the lithium sulfide material and a lithium phosphorus sulfide material.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate typical embodiments of this disclosure and are therefore not to be considered limiting of its scope. The disclosure may admit to other equally effective embodiments.

To facilitate understanding, identical reference numerals have been used, wherever possible, to designate identical elements that are common to the figures. Additionally, elements of one embodiment may be advantageously adapted for utilization in other embodiments described herein.

DETAILED DESCRIPTION

To provide context, batteries based on lithium sulfide, $Li_2S$, can include a number of desired attributes, including low cost and a high specific capacity of 1108 mAh/g. By using a lithiated sulfur cathode, batteries can be fabricated without using a lithium metal anode. However, batteries based on the lithium sulfide have several major challenges.

Most notably, the dissolution of lithium polysulfides into the electrolyte during the reduction of sulfur and the polysulfide shuttling effect, has been observed. Further, when exposed to moisture in the air, lithium sulfide can decompose into hydrogen sulfide ($H_2S$) gas. Further, due to the reactivity of lithium with gases, such as $CO_2$, $N_2$, $O_2$, lithium metal is easily compromised by a layer of lithium salts on the surface, such as $Li_2CO_3$, $Li_3N$, LiOH as $Li_2O$. These salts result in inactivation of the lithium metal surface. Thus, exploration into a lithium sulfide cathode, such as for use in an all solid-state battery, has relied on an inert-gas environment to avoid decomposition. This decomposition can decrease the capacity of the battery.

To address these issues and others, lithium sulfide-lithium phosphorus sulfide composites for use in lithium batteries and methods for producing the same are disclosed. Disclosed herein is the synthesis of lithium sulfide ($Li_2S_w$)-lithium phosphorus sulfide ($Li_xP_yS_z$) composites by using mechanochemical synthesis. The $Li_2S_w$—$Li_xP_yS_z$ composite is an electrochemically active cathode material that presents increased stability to $H_2S$ generation, over $Li_2S$ alone. The suppression of $H_2S$ generation allows for production of cathode materials in ambient air conditions, thus reducing production costs and increasing long term stability of the battery. Throughout this description, the terms "electrochemical cell" and "battery" may be employed interchangeably unless the context of the description clearly distinguishes an electrochemical cell from a battery. The embodiments disclosed herein are more clearly described with reference to the figures below.

Figure 1:
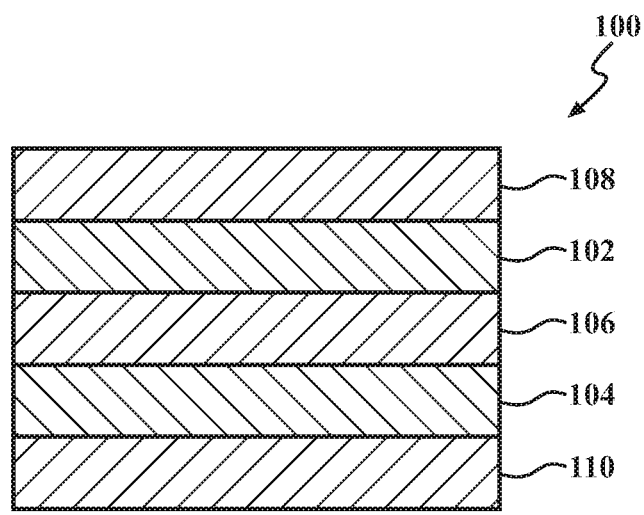
FIG. 1 is a schematic view of a lithium solid-state battery, according to embodiments disclosed herein.

FIG. 1 is a schematic sectional view showing an example of a lithium solid-state battery 100, according to embodiments described herein. The lithium solid-state battery 100 shown in FIG. 1 includes a positive electrode active material layer 102 containing a positive electrode active material, a negative electrode active material layer 104 containing a negative electrode active material, a solid electrolyte layer 106 formed between the positive electrode active material layer 102 and the negative electrode active material layer 104, a positive electrode collector 108 that collects current of the positive electrode active material layer 102, and a negative electrode collector 110 that collects current of the negative electrode active material layer 104. In one or more embodiments described herein, at least one of the positive electrode active material layer 102, the negative electrode active material layer 104 and the solid electrolyte layer 106 includes a solid electrolyte material. Respective constituents of the lithium solid-state battery 100, in light of exemplary embodiments, will be described below.

The discussion of the lithium solid-state battery 100 begins with a positive electrode active material layer 102. The positive electrode active material layer 102, referred to in some instances as the cathode, is a layer that contains at least a positive electrode active material. The positive electrode active material layer 102 can further contain at least one of a solid electrolyte material, a conductive material and a binder, as required. In one or more embodiments described herein, a positive electrode active material contained in the positive electrode active material layer 102 can include the $Li_2S_w$—$Li_xP_yS_z$ composite. The content of the $Li_2S_w$-$Li_xP_yS_z$ composite in the positive electrode active material layer 102 can be in a range which allows function as part of a lithium solid-state battery 100. In one or more exemplary embodiments, the $Li_2S_w$-$Li_xP_yS_z$ composite can be present in a range of about 0.1% by volume to about 99% by volume, in a range of about 1% by volume to about 60% by volume, and in a range of about 10% by volume to about 50% by volume, or others.

The positive electrode active material layer 102, in one or more embodiments described herein, may further contain at least one of a conductive material and a binder. Examples of the conductive material include acetylene black, Ketjen black, carbon fiber and so on. Examples of the binder include fluorine-containing binders such as PTFE and PVDF. A thickness of the positive electrode active material layer 102 can be determined based on, in part, the size and shape of the solid-state battery and desires of the user. In one embodiment, the thickness of the positive electrode active material layer 102 is in a range of about from 0.1 µm to 1000 µm. Further, the positive electrode active material layer 102 can further include one or more dopants, such as $Li_3N$, $Li_3P$, $Li_2O$, $Li_3BO_3$, or $LiBH_4$.

The negative electrode active material layer 104, referred to in some instances as the anode, is a layer that contains at least a negative electrode active material. The negative electrode active material layer 104 can further contain at least one of a solid electrolyte material, a conductive material and a binder, as desired. Generally, the negative electrode active material layer 104 can include any kind of negative electrode active material that is compatible with lithium sulfide-lithium phosphorus sulfide cell electrochemistry. In one or more embodiments described herein, a negative electrode active material contained in the negative electrode active material layer 104 can include one or more metal active materials, one or more non-metal active materials, and mixtures thereof. Examples of the metal active materials useable as part of the negative electrode active material layer 104 can include In, Al, Si, Sn, Ni, $Li_4Ti_5O_{12}$, $Mo_6S_8$, $Cu_2V_2O_7$, $TiS_4$, $NbS_5$, Li terephthalate ($C_8H_4Li_2O_4$). Examples of the non-metal active materials useable as part of the negative electrode active material layer 104 can include mesocarbon microbeads (MCMB), highly ordered pyrolytic graphite (HOPG), hard carbon, soft carbon, silicon, sulfur, graphite, and so on. In one or more embodiments described herein, a solid electrolyte material contained in the negative electrode active material layer 104 can be a sulfide solid electrolyte material or a thiophosphate solid electrolyte material. One example of the solid electrolyte material is $Li_3PS_4$. Concentrations of the solid electrolyte material in the negative electrode active material layer 104 can be present in a range of about 0.1% by volume to about 80% by volume, such as in a range of about 1% by volume to about 60% by volume, or in a range of about 10% by volume to about 50% by volume.

In one embodiment, the content of the negative electrode active material in the negative electrode active material layer 104 can be present in a range of about 10% by volume to about 99% by volume, such as in a range of about 20% by volume to about 99% by volume. Both the conductive material and the binder can be the same as those used in the positive electrode active material layer 102. In another embodiment, the thickness of the negative electrode active material layer 104 can be present in a range of about 0.1 µm to 1000 µm. In another embodiment, the thickness of the negative electrode active material layer 104 is in a range of about 0.1 µm to 300 µm. These thicknesses can be in the presence or absence of the binder. Further, these thicknesses can be applied to the binder alone, the solid electrolyte alone or the combination.

Next, the solid electrolyte layer 106 will be described with relation to one or more embodiments. The solid electrolyte layer 106 can include at least a solid electrolyte material.

The solid electrolyte layer 106 can be a layer formed between the positive electrode active material layer 102 and the negative electrode active material layer 104. The solid electrolyte material contained in the solid electrolyte layer 106 can include a variety of compounds that have Li-ion conductivity. In one embodiment, the solid electrolyte material contained in the solid electrolyte layer 106 can include a sulfur containing solid electrolyte material. In one example, the sulfur containing solid electrolyte material is a thiophosphate solid electrolyte material, such as $Li_3PS_4$. In one or more embodiments, the content of the solid electrolyte material in the solid electrolyte layer 106 can vary such that the desired insulating properties are maintained. The solid electrolyte material can be present in a range of about 10% by volume to about 100% by volume, such as in a range of about 50% by volume to about 100% by volume. In another embodiment, the solid electrolyte layer 106 can consist primarily of the sulfide solid electrolyte material.

Further, the solid electrolyte layer 106 may contain a binder. In one or more embodiments, the binder can provide flexibility to the solid electrolyte layer 106. In one example, the binder can include fluorine-containing binders, such as PTFE and PVDF. The thickness of the solid electrolyte layer 106, the binder, or combinations thereof can vary with the needs of the device. In one embodiment, the thickness of the solid electrolyte layer is in a range of about 0.1 μm to 1000 μm. In another embodiment, the thickness of the solid electrolyte layer is in a range of about 0.1 μm to 300 μm. These thicknesses can be in the presence or absence of the binder. Further, these thicknesses can be applied to the binder alone, the solid electrolyte alone or the combination.

Further, the lithium solid-state battery 100 can include the positive electrode collector 108. The positive electrode collector 108 can collect current of the positive electrode active material layer 102. Examples of the material which can be used as part of the positive electrode collector 108 can include SUS, aluminum, nickel, iron, titanium, carbon, and so on. Further, a thickness, a shape and so on of the positive electrode collector 108 and the negative electrode collector 110 can be selected appropriately in accordance with related sizes, usages and applications of the lithium solid-state battery 100.

The lithium solid-state battery 100 can further include the negative electrode collector 110. The negative electrode collector 110 can collect current of the negative electrode active material layer 104. Examples of the material of the negative electrode collector 110 include SUS, copper, nickel, carbon and so on. Further, a thickness, a shape and so on of the positive electrode collector 108 and the negative electrode collector 110 can be selected appropriately in accordance with usages and so on of the lithium solid-state battery 100.

The lithium solid-state battery 100, as described through embodiments herein, may be a primary battery or a secondary battery. As well, the lithium solid-state battery 100 can be a variety of shapes to serve the desires of the end user. Examples of shapes for the lithium solid-state battery 100 can include a coin shape, a laminate shape, a cylinder shape, and a rectangular shape. Further shapes, thicknesses, and other physical features related to the lithium solid-state battery 100 may be employed without diverging from the embodiments disclosed herein, so long as the above described lithium battery is produced.

The positive electrode active material layer 102 can be fabricated as part of the lithium solid-state battery 100 using at least $Li_2S_w$ and $Li_xP_yS_z$ as described above. The lithium solid-state battery 100 can be fabricated by pressing the positive electrode active material layer 102, solid electrolyte layer 106, and the negative electrode active material layer 104 together, with or without heat. In one embodiment, the lithium solid-state battery 100 can be prepared by a three-step method. In the first step, solid electrolyte material can be placed into an appropriately shaped chamber and pressed into a solid electrolyte layer 106. The first step can include a force capable of compressing the material into a single unit. The second step can include spreading positive electrode active material over the surface of the solid electrolyte layer 106. The positive electrode active material can then pressed into the solid electrolyte layer 106. This creates a stack, including the positive electrode active material layer 102 disposed over an exposed surface of the solid electrolyte layer 106. The negative electrode active material can then be spread over the opposite side of the solid electrolyte layer 106. The negative electrode active material layer 104 can then be pressed into the solid electrolyte layer 106. The three layer stack forms the primary components of the lithium solid-state battery 100, including the positive electrode active material layer 102, the solid electrolyte layer 106, and the negative electrode active material layer 104.

Further, the method for producing a lithium solid-state battery 100 is not particularly limited, so long as the above described lithium solid-state battery can be produced. Namely, a general method for producing the lithium solid-state battery 100 can also be used. Examples of the method for producing the lithium solid-state battery 100 can include a method in which a material that configures a positive electrode active material layer, a material that configures a solid electrolyte layer, and a material that configures a negative electrode active material layer are sequentially pressed to prepare an electricity-generating element, the electricity-generating element is housed inside of a battery case, and the battery case is caulked, and so on.

Figure 2:
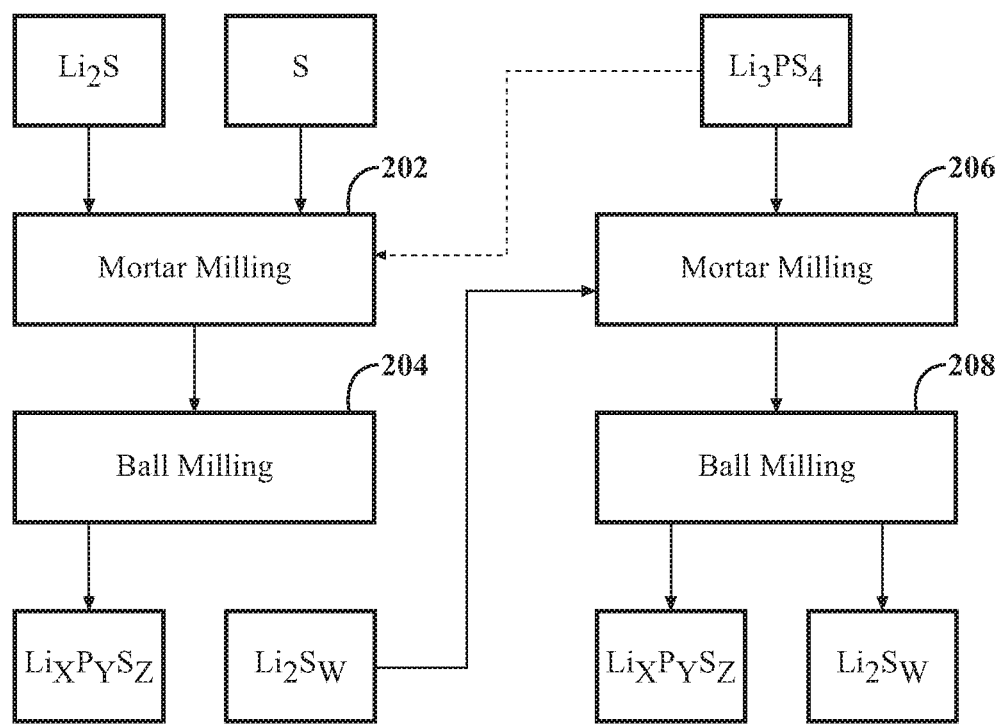
FIG. 2 is a flow chart showing an example of a method for producing a lithium phosphorus sulfur positive electrode material, according to embodiments disclosed herein.

FIG. 2 depicts a flow chart for an exemplary method 200 for producing the $Li_2S_w$-$L_xP_yS_z$ positive electrode material, according to embodiments described herein. $Li_2S_w$-$L_xP_yS_z$ composite can be synthesized by a solid-state synthesis method. In one embodiment, the $Li_2S_w$-$L_xP_yS_z$ composite can be synthesized by a two-step method. The two-step version of the method 200 can include a first step of mixing a charge material and discharge material. The charge material can be a sulfur containing material, such as atomic sulfur. The discharge material can be a lithium sulfur containing material, such as $Li_2S$. The mixing of the charge material and the discharge material can be performed by ball milling, mortar, or others. Upon mixing the charge material and the discharge material, a lithium polysulfide ($Li_2S_w$) composite can be formed.

In an exemplary embodiment of the first step, lithium sulfide and sulfur are combined in a mortar, at 202. The lithium sulfide can be present in a range from about 5% by weight to about 95% by weight, such as from about 20% by weight to about 80% by weight. The atomic sulfur can be present in a range from about 5% by weight to about 95% by weight, such as from about 20% by weight to about 80% by weight. The lithium sulfide and the sulfur can be mixed over a time frame sufficient for complete and thorough mixing of the composition and activation of the mixture.

Then, the composition is further mixed in a stepwise fashion from the mortar to the ball mill, at 204. The time for mortar mixing can be a period of minutes or hours, such as from about 10 min to about 1 h in the mortar. The time for ball mill mixing can be a period of hours or days, such as from about 1 day to about 7 days, for a resulting mixed composition including $Li_2S_w$. $Li_2S_w$ can be a variety of chemical compounds having a range of sulfur chain lengths and formations. In one embodiment, the mixed composition includes $Li_2S_w$ compounds, where w is from 1 to 50, such as from about 2 to 20.

The second step can include mixing the solid electrolyte and the $Li_2S_w$ composite. In one embodiment, the solid electrolyte can be an active material phosphorus sulfur containing material, such as $Li_3PS_4$. In further embodiments, the concentrations of lithium and phosphorus can be modified through the addition of lithium and phosphorus containing compounds or phosphorus and sulfur containing compounds, such as lithium phosphide ($Li_3P$), phosphorus, $P_2S_3$, $P_2S_5$, and others. The mixing of the solid electrolyte and the $Li_2S_w$ composite can be performed by ball milling, mortar, or others. The $Li_2S_w$-$L_xP_yS_z$ composite is formed during the mixing of the solid electrolyte and the $Li_2S_w$ composite. The $Li_2S_w$-$L_xP_yS_z$ composite can include one or more $Li_2S_w$ compounds (such as $Li_2S$), in varying concentrations, and one or more $L_xP_yS_z$ compounds, in varying concentrations, as described herein.

In an exemplary embodiment of the second step, $Li_2S_w$ and the solid electrolyte are combined in a mortar, at 206. In one or more embodiments, the solid electrolyte can include $Li_3PS_4$. The $Li_2S_w$ can be present in a range from about 5% by weight to about 95% by weight, such as from about 20% by weight to about 80% by weight. The $Li_3PS_4$ can be present in a range from about 5% by weight to about 95% by weight, such as from about 20% by weight to about 80% by weight. The $Li_2S_w$ and the $Li_3PS_4$ can be mixed over a time frame sufficient for complete and thorough mixing of the composition and activation of the mixture.

Then, the composition is further mixed in a stepwise fashion from the mortar to the ball mill, at 208. The time for mortar mixing can be a period of minutes or hours, such as from about 10 min to about 1 h in the mortar. The time for ball mill mixing can be a period of hours or days, such as from about 1 day to about 7 days, for a resulting mixed composition including $Li_2S_w$ and $L_xP_yS_z$. $L_xP_yS_z$ can be a variety of chemical compounds having a range of lithium, phosphorus, and sulfur permutations. In one embodiment, the resulting composition includes $L_xP_yS_z$ compounds, where x, y, and x, is from 1 to 50, such as from about 2 to 20.

In another embodiment, the $Li_2S$-$L_xP_yS_z$ material can be synthesized by a one-step method. The one-step method can include mixing the charge material, the discharge material, and the solid electrolyte. The charge material, the discharge material, and the solid electrolyte can be substantially similar as described above with reference to the two-step method. The mixing of the charge material, the discharge material, and the solid electrolyte can be performed by ball milling, mortar, or others. Through mixing by this technique, using the charge material, the discharge material, and the solid electrolyte simultaneously, the $Li_2S$-$L_xP_yS_z$ composite can be formed.

In an exemplary embodiment of the one-step method, $Li_2S$, sulfur, and the solid electrolyte are combined in a mortar, at 202. In one or more embodiments, the solid electrolyte can include $Li_3PS_4$. The $Li_2S$ can be present in a range from about 5% by weight to about 95% by weight, such as from about 20% by weight to about 80% by weight. The sulfur can be present in a range from about 5% by weight to about 95% by weight, such as from about 20% by weight to about 80% by weight. The $Li_3PS_4$ can be present in a range from about 5% by weight to about 95% by weight, such as from about 20% by weight to about 80% by weight. The $Li_2S$, sulfur and $Li_3PS_4$ can be mixed over a time frame sufficient for complete and thorough mixing of the composition and activation of the mixture.

Subsequently, the composition is further mixed in a stepwise fashion from the mortar to the ball mill, at 204. The time for mortar mixing can be a period of minutes or hours, such as from about 10 min to about 1 h in the mortar. The time for ball mill mixing can be a period of hours or days, such as from about 1 day to about 7 days, for a resulting mixed composition including $Li_2S_w$ and $L_xP_yS_z$. $L_xP_yS_z$ can be a variety of chemical compounds having a range of lithium, phosphorus, and sulfur constituents and permutations. In one embodiment, the resulting composition includes $L_xP_yS_z$ compounds, where x, y, and x, is from 1 to 50, such as from about 2 to 20. In the one-step version of method 200, the second mortar milling at 206 and the second ball milling at 208 are unnecessary.

In further embodiments, carbon can also be incorporated into the $Li_2S_w$—$Li_xP_yS_z$ composite. The carbon can be incorporated in the one-step or two-step methods described above. In another exemplary embodiment, we can start at the second step of the two-step method. $Li_2S_w$, carbon, and the solid electrolyte can be combined in a mortar, at 206. In one or more embodiments, the solid electrolyte can include $Li_3PS_4$. The $Li_2S_w$ can be present in a range from about 20% by weight to about 80% by weight, such as from about 30% by weight to about 70% by weight. The carbon can be present in a range from about 5% by weight to about 30% by weight, such as from about 10% by weight to about 20% by weight. The $Li_3PS_4$ can be present in a range from about 20% by weight to about 50% by weight, such as from about 30% by weight to about 40% by weight. The $Li_2S_w$, the carbon and the solid electrolyte can be mixed over a time frame sufficient for complete and thorough mixing of the composition and activation of the mixture.

Then, the composition is further mixed in a stepwise fashion from the mortar to the ball mill, at 208. The time for mortar mixing can be a period of minutes or hours, such as from about 10 min to about 1 h in the mortar. The time for ball mill mixing can be a period of hours or days, such as from about 1 day to about 7 days, for a resulting mixed composition including $Li_2S_w$, carbon and $L_xP_yS_z$. $L_xP_yS_z$ can be a variety of chemical compounds having a range of lithium, phosphorus, and sulfur permutations. In one embodiment, the resulting composition includes $L_xP_yS_z$ compounds, where x, y, and x, is from 1 to 50, such as from about 2 to 20.

Carbon can further be incorporated into the $Li_2S_w$—$Li_xP_yS_z$ composite by the one-step method. Here, $Li_2S$, carbon, sulfur, and the solid electrolyte are combined in a mortar, at 202. In one or more embodiments, the solid electrolyte can include $Li_3PS_4$. The $Li_2S$ can be present in a range from about 5% by weight to about 95% by weight, such as from about 20% by weight to about 80% by weight. The carbon can be present in a range from about 5% by weight to about 30% by weight, such as from about 10% by weight to about 20% by weight. The sulfur can be present in a range from about 5% by weight to about 95% by weight, such as from about 20% by weight to about 80% by weight. The $Li_3PS_4$ can be present in a range from about 5% by weight to about 95% by weight, such as from about 20% by weight to about 50% by weight. The $Li_2S$, carbon, sulfur and $Li_3PS_4$ can be mixed over a time frame sufficient for complete and thorough mixing of the composition and activation of the mixture.

Subsequently, the composition is further mixed in a stepwise fashion from the mortar to the ball mill, at 204. The time for mortar mixing can be a period of minutes or hours, such as from about 10 min to about 1 h in the mortar. The time for ball mill mixing can be a period of hours or days, such as from about 1 day to about 7 days, for a resulting mixed composition including $Li_2S_w$ and $L_xP_yS_z$. $L_xP_yS_z$ can be a variety of chemical compounds having a range of lithium, phosphorus, and sulfur constituents and permutations. In one embodiment, the resulting composition includes $L_xP_yS_z$ compounds, where x, y, and x, is from 1 to 50, such as from about 2 to 20. In the one-step version of method 200, the second mortar milling at 206 and the second ball milling at 208 are unnecessary.

Through the above method, a positive electrode active material including the $Li_2S_w$—$Li_xP_yS_z$ composite can be produced. The positive electrode active material can be produced under an ambient environment. Further, the positive electrode active material including the $Li_2S_w$—$Li_xP_yS_z$ composite provides a capacity advantage over currently available lithium batteries.

Figure 3:
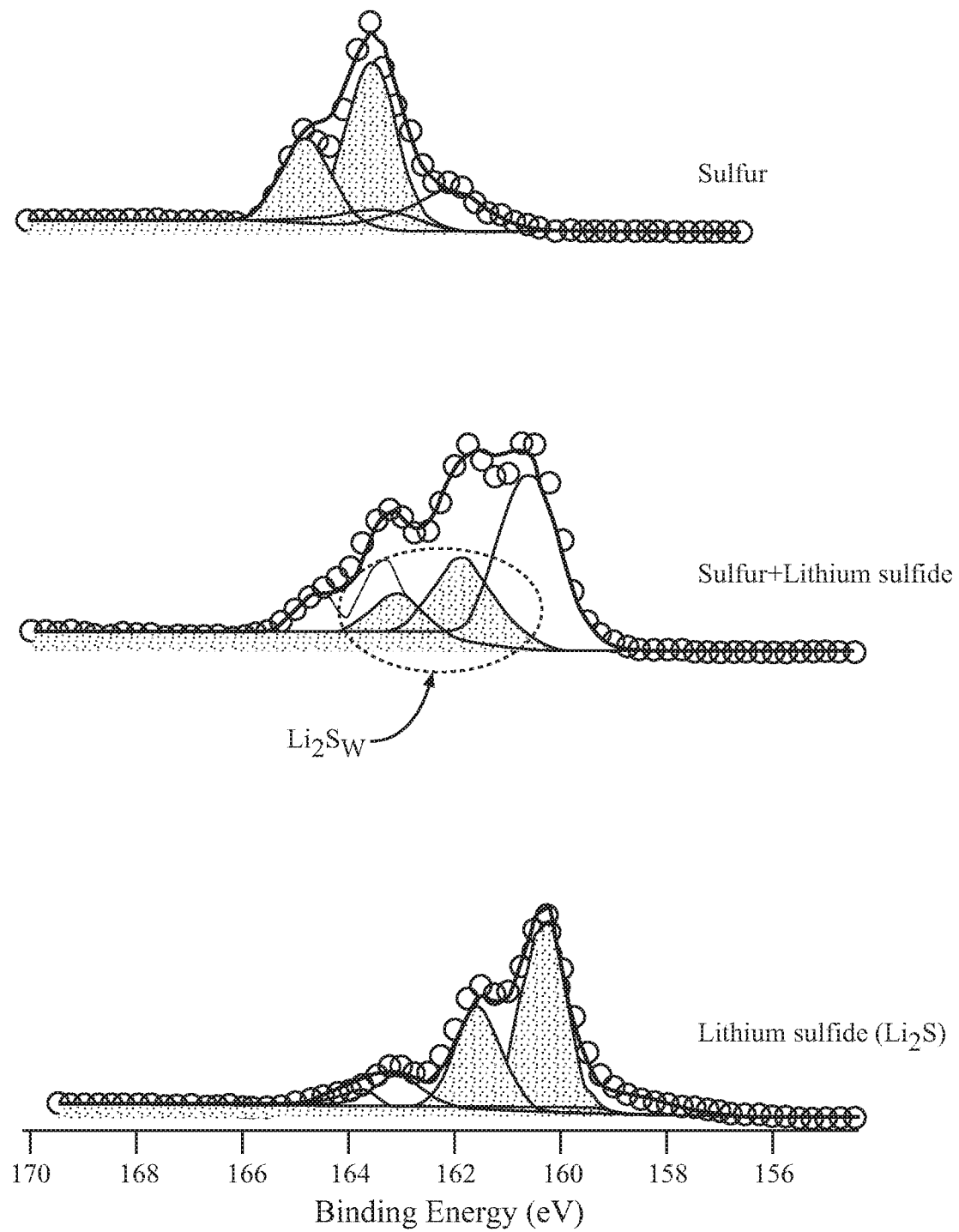
FIG. 3 is the X-ray photoelectron spectroscopy (XPS) showing the synthesis of $Li_2S_w$, according to one or more embodiments.

FIG. 3 is the XPS showing the synthesis of $Li_2S_w$, according to one or more embodiments. Using the method and conditions set forth hereinabove for the first step of the two-step method, an investigation of the chemical composition was conducted. $Li_2S_w$ compositions were formed by the methods described above. The first graph is a depiction of the XPS showing sulfur alone, showing peaks at 163 eV and 165 eV. The third graph is a depiction of the XPS showing lithium sulfide ($Li_2S$) alone, showing peaks at 160 eV and 161.5 eV. The second graph is a depiction of the XPS showing sulfur mixed with $Li_2S$ by the first step of the two-step method described above. Here, the graph shows the sulfur peaks at 163 eV and 165 eV, the $Li_2S$ peaks at 160 eV and 161.5 eV, and a third set of peaks for the $Li_2S_w$ compound at 161.5 eV and 163 eV.

Compositional results determined by XPS, show that a new species $Li_2S_w$ is made from the milling of sulfur and lithium sulfide. Further, by comparison of relative peak heights, including the spread of said peaks, concentration of the $Li_2S_w$ components appear to be equivalent to or slightly higher than the sulfur component, after mixing. Thus, the XPS analysis makes evident that a new species $Li_2S_w$ is made from the milling of sulfur and $Li_2S$. This composition was then transferred for combination with $Li_3PS_4$ in the second step of the two-step method.

Figure 4A:
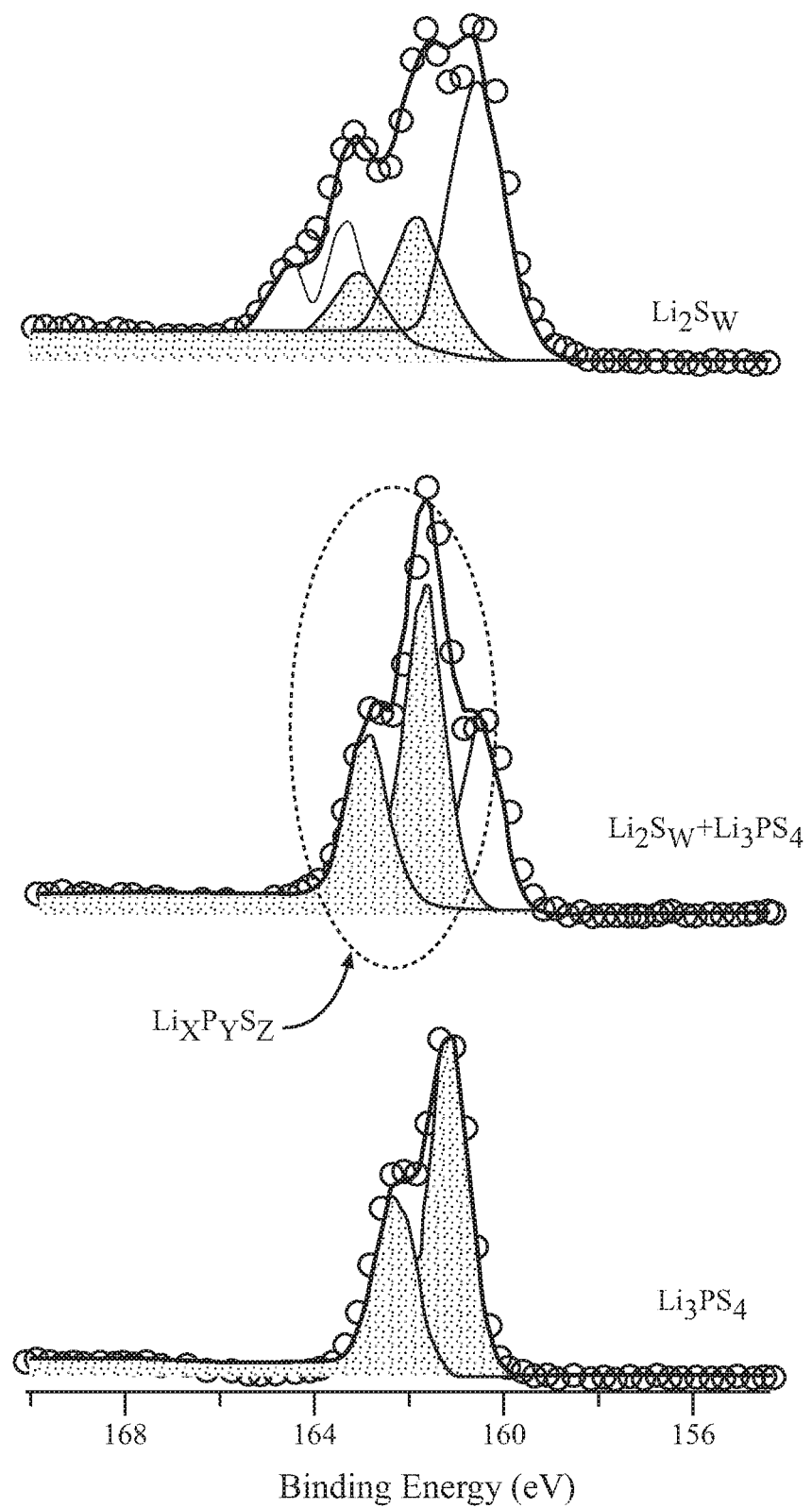
FIG. 4A is the XPS showing the synthesis of $Li_xP_yS_z$, according to one or more embodiments.

FIG. 4A is the XPS showing the synthesis of $Li_xP_yS_z$, according to one or more embodiments. Using the method and conditions set forth hereinabove for the second step of the two-step method, an investigation of the chemical composition was conducted. $Li_2S_w$—$Li_xP_yS_z$ compositions were formed by the methods described above. The first graph is a depiction of the XPS for the combination of sulfur, $Li_2S$, $Li_2S_w$ from the first step. As above, the XPS analysis here shows peaks at 160 eV, 161.5 eV, 163 eV, and 165 eV, corresponding to the respective components described above. The third graph is a depiction of the XPS showing lithium thiophosphate ($Li_3PS_4$) alone, showing peaks at 161 eV and 162.5 eV. The second graph is a depiction of the XPS showing the sulfur/$Li_2S$/$Li_2S_w$ composition mixed with $Li_3PS_4$ by the second step of the two-step method described above. Here, the graph shows a first set of peaks for the $Li_xP_yS_z$, which include $Li_3PS_4$ peaks, at 161 eV and 162.5 eV, and a second set of peaks for the $Li_2S_w$ compound at 161.5 eV and 163 eV.

Compositional results determined by XPS, show that a new species $Li_xP_yS_z$ is made from the milling of sulfur, $Li_2S_w$ and $Li_3PS_4$. Further, by comparison of relative peak heights, including the spread of said peaks, concentration of the $Li_2S_w$ components appear to be equivalent to or slightly higher than the sulfur component, after mixing. Thus, the XPS analysis makes evident that a new species $Li_xP_yS_z$ is made from the milling of sulfur, $Li_2S_w$ and $Li_3PS_4$ through a mechanochemical synthesis. This composition was then further analyzed by Raman spectroscopy for $Li_xP_yS_z$ formation.

Figure 4B:
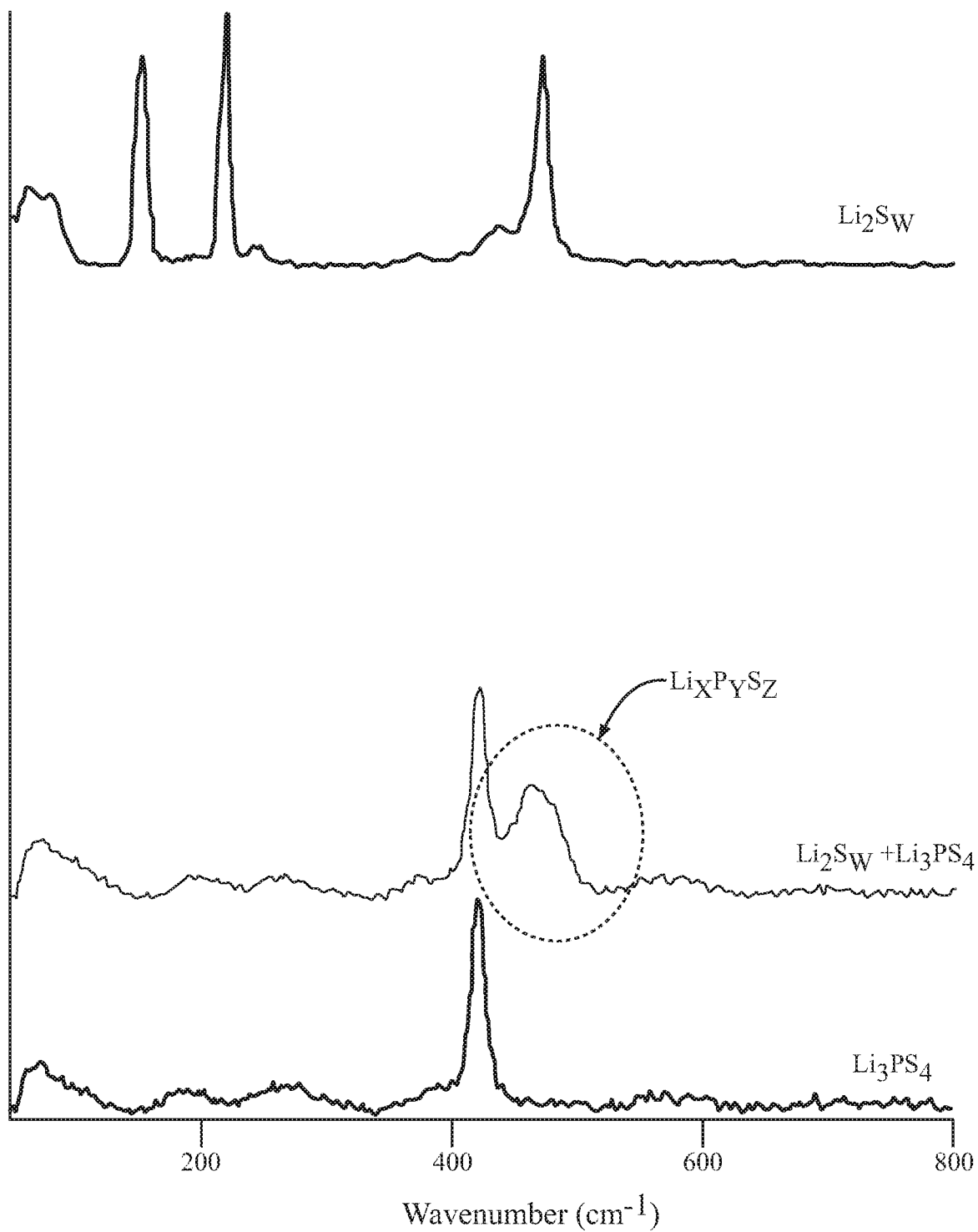
FIG. 4B depicts the Raman spectrogram of $Li_xP_yS_z$ formation, according to embodiments described herein.

FIG. 4B depicts the Raman spectrogram of $Li_xP_yS_z$ formation, according to embodiments described herein. Here, the formation of $Li_2S_w$—$Li_xP_yS_z$ compound using $Li_2S$, sulfur, and the solid electrolyte, $Li_3PS_4$, was observed by the Raman spectroscopy. $Li_2S_w$—$Li_xP_yS_z$ compound was prepared from $Li_2S$, sulfur, and $Li_3PS_4$, using the two-step mortar and ball milling method, described above with reference to FIG. 2. In this method, the $Li_2S$ and sulfur are mortared and ball milled to produce $Li_2S_w$. After that, the solid electrolyte, $Li_3PS_4$, can then be added to the $Li_2S_w$, then mortared and ball milled to produce the $Li_2S_w$—$Li_xP_yS_z$ compound. The Raman spectrum was measured with respect to the powder composite formed. Results of the measurement are shown in FIG. 4B.

Three plots are shown in FIG. 4B. The first plot depicts the Raman spectrum of the $Li_2S_w$ alone. The third plot depicts the Raman spectrum of the $Li_3PS_4$ alone. The second plot depicts the combination of the $Li_2S_w$ and the $Li_3PS_4$ by the mechanochemical synthesis described above. The peaks at 180 cm$^{-1}$, 220 cm$^{-1}$, and 450 cm$^{-1}$ are the peaks of the $Li_2S_w$ species. The peak at 420 cm$^{-1}$ is the peak of $Li_3PS_4$. In the combination shown in the second plot, the wide peak at 460 cm$^{-1}$, is the peak of the $Li_xP_yS_z$ composite. In the second plot, great peaks at 420 cm$^{-1}$ and 450 cm$^{-1}$ are detected but reduced, while the 460 cm$^{-1}$ peak is comparatively larger. Further, the broad tails on the 460 cm$^{-1}$ peak, apparently extending between 400 cm$^{-1}$ and 500 cm$^{-1}$, speak to a variety of species of LixPySz as well as overlapping $Li_2S_w$ species. From these observations, it has been confirmed that the $Li_2S_w$—$Li_xP_yS_z$ compound structure has been formed by the two-step method.

Figure 5:
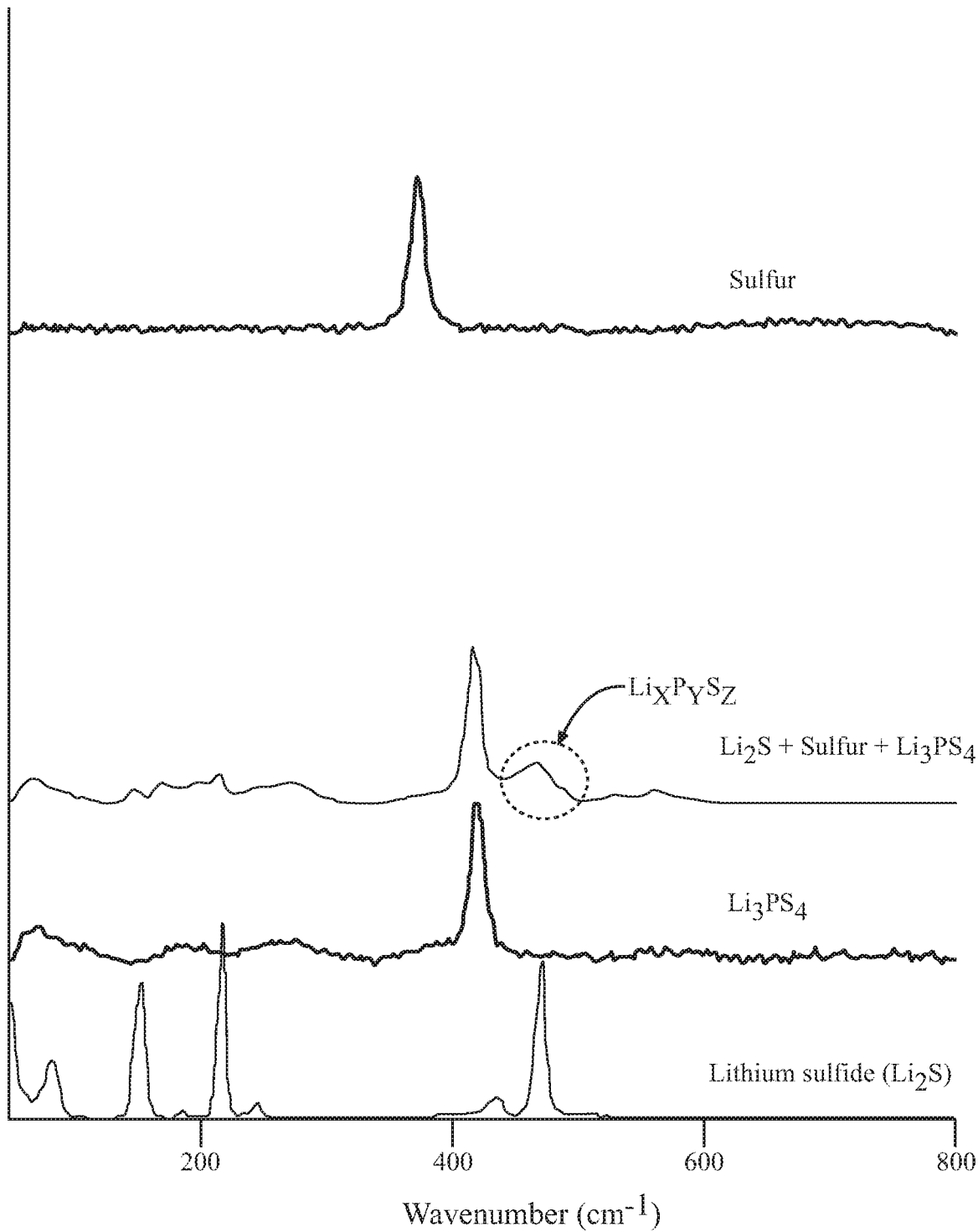
FIG. 5 depicts the Raman spectrogram of $Li_xP_yS_z$ formation, according to embodiments described herein.

FIG. 5 depicts the Raman spectrogram of $Li_xP_yS_z$ formation, according to embodiments described herein. Here, the formation of $Li_2S_w$—$Li_xP_yS_z$ compound using $Li_2S$, sulfur, and the solid electrolyte, $Li_3PS_4$, was observed by the Raman spectroscopy. $Li_2S_w$—$Li_xP_yS_z$ compound was prepared from $Li_2S$, sulfur, and $Li_3PS_4$, using the one-step mortar and ball milling method, described above with reference to FIG. 2. In this embodiment, the $Li_2S$, sulfur, and the solid electrolyte, $Li_3PS_4$, are mortared and ball milled to produce $Li_2S_w$—$Li_xP_yS_z$ compound. After that, the Raman spectrum was measured with respect to the powder composite formed. Results of the measurement are shown in FIG. 5.

Four plots are shown in FIG. 5. The first plot depicts the Raman spectrum of the sulfur alone. The third plot depicts the Raman spectrum of the $Li_3PS_4$ alone. The fourth plot depicts the Raman spectrum of the $Li_2S$ alone. The second plot depicts the combination of the $Li_2S_w$ and the $Li_3PS_4$ by the mechanochemical synthesis described above. In the first plot, the peak at 380 cm$^{-1}$ is the peak of sulfur. Shown in the fourth plot, the peaks at 180 cm$^{-1}$, 220 cm$^{-1}$, and 450 cm$^{-1}$ are the peaks of the $Li_2S$ species. Shown in the third plot, the peak at 420 cm$^{-1}$ is the peak of $Li_3PS_4$. In the combination shown in the second plot, the wide peak at 460 cm$^{-1}$, is the peak of the $Li_xP_yS_z$ composite. In the third plot, great peaks at 420 cm$^{-1}$ and 450 cm$^{-1}$ are detected but reduced, while the 460 cm$^{-1}$ peak is comparatively larger. Further, the broad tails on the 460 cm$^{-1}$ peak, apparently extending between 400 cm$^{-1}$ and 500 cm$^{-1}$, speak to a variety of species of $Li_xP_yS_z$ as well as overlapping $Li_2S_w$ species. From these observations, it has been confirmed that the $Li_2S_w$—$Li_xP_yS_z$ compound structure has been formed by the one-step method.

Figure 6A:
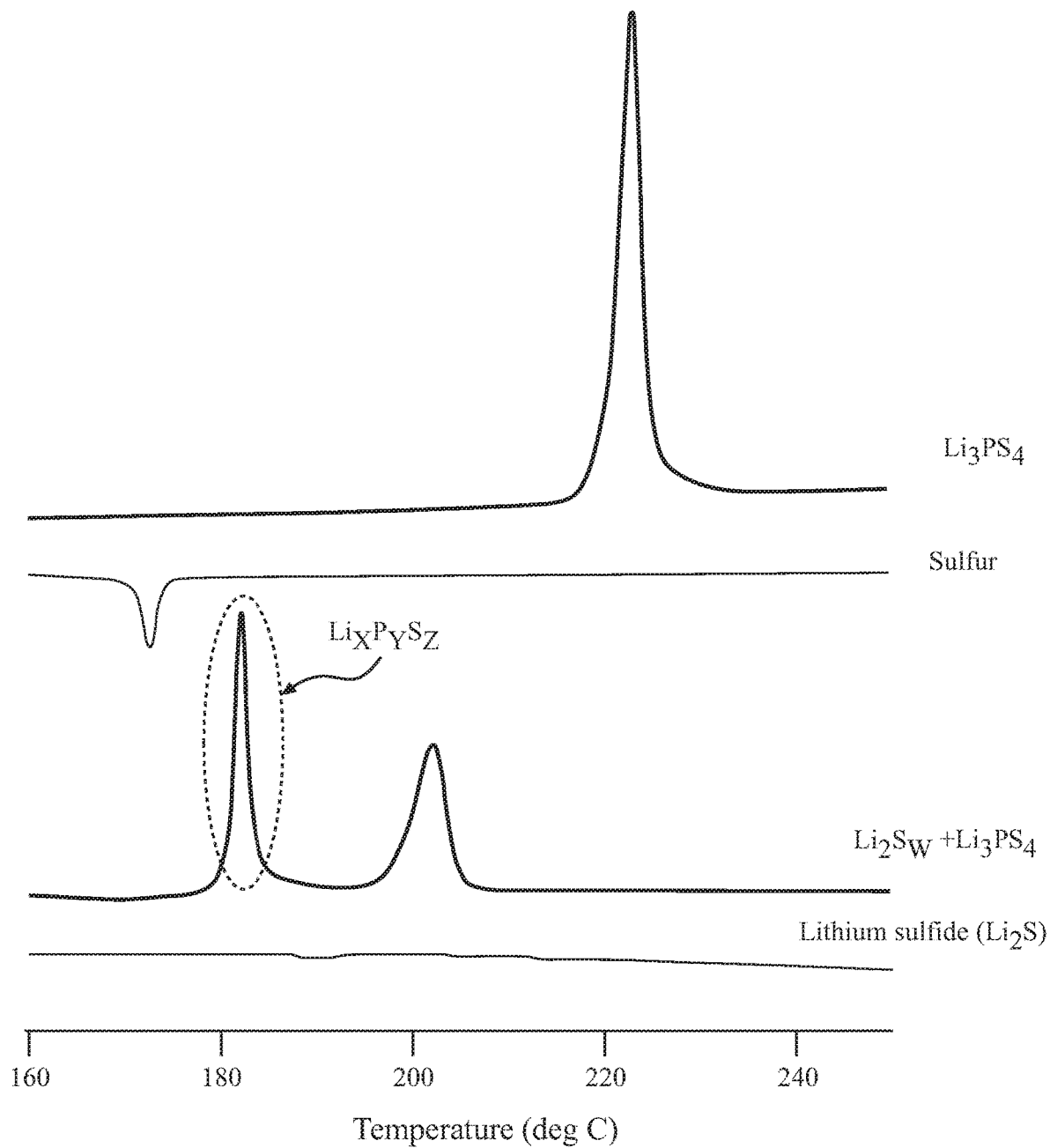
FIGS. 6A and 6B depict differential scanning calorimetry (DSC) of $Li_xP_yS_z$ formation, according to embodiments described herein.
Figure 6B:
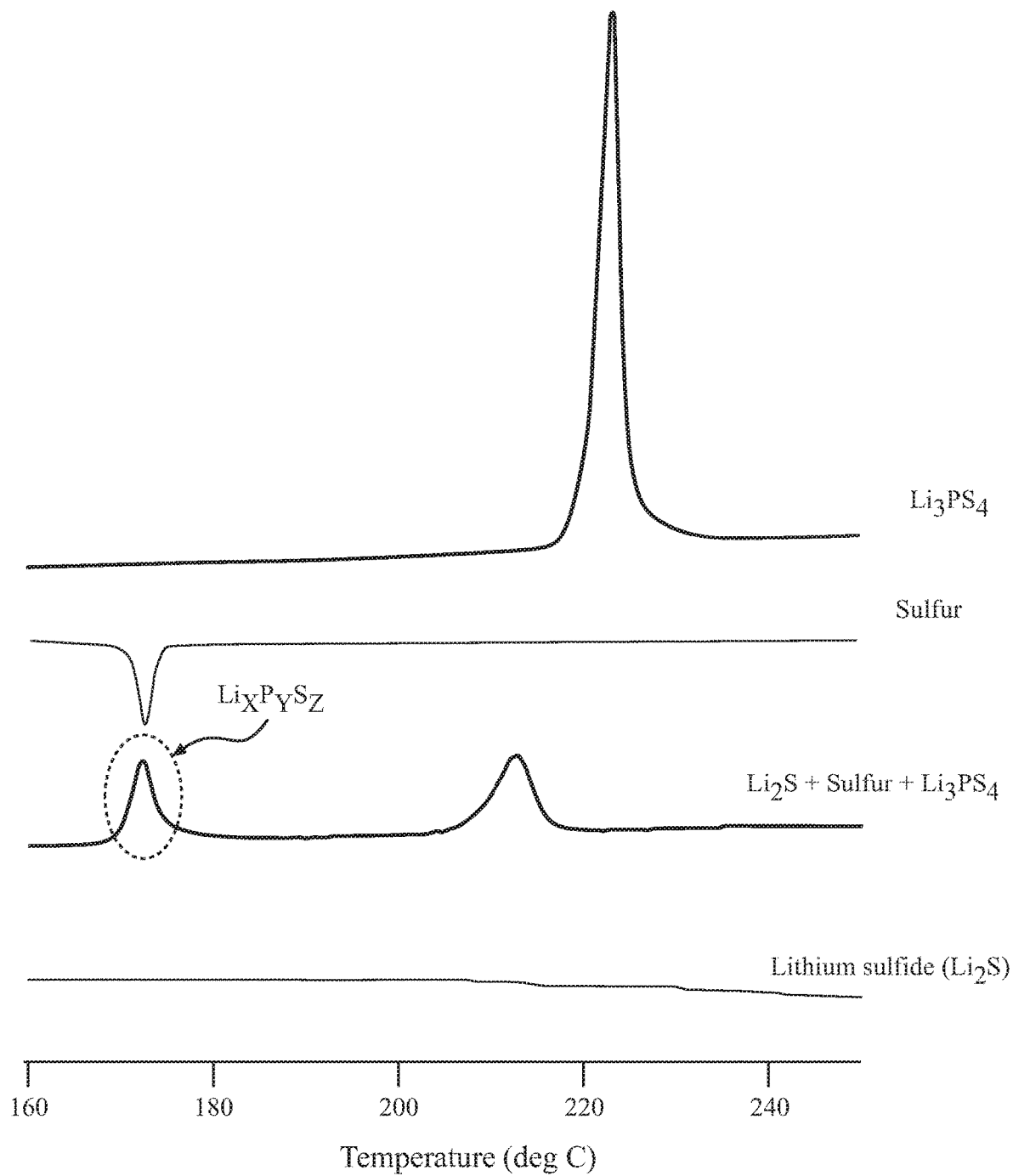

FIGS. 6A and 6B depict the DSC of the $Li_2S_w$—$Li_xP_yS_z$ compound formation, according to one or more embodiments. FIG. 6A is the DSC showing the synthesis of the $Li_2S_w$—$Li_xP_yS_z$ compound using the two-step method. A method of manufacturing the positive electrode active material, the $Li_2S_w$—$Li_xP_yS_z$ compound, is described above with reference to FIGS. 1 and 2. First, the $Li_2S$ and sulfur were mortared, using the concentrations and time frames described above, and ball milled to produce $Li_2S_w$. After that, the solid electrolyte, $Li_3PS_4$, was then be added to the $Li_2S_w$. The mixture was then mortared and ball milled, using the concentrations and time frames described above, to produce the $Li_2S_w$—$Li_xP_yS_z$ compound. Next, 5 mg of the positive electrode active material was added to a stainless steel container for DSC, and the container was sealed. The sealed container was set in a DSC apparatus, and the measurement was conducted with a temperature rising speed of 5° C./min, and an end temperature of 300° C. The same steps were taken for the method components of the $Li_2S_w$—$Li_xP_yS_z$ compound, including $Li_3PS_4$, Sulfur and $Li_2S$.

From the results of DSC, an endothermic and exothermic transitions, including an exothermic peak temperature, is plotted here. $Li_3PS_4$ shows a single peak at 225° C. Sulfur shows a single downward peak, an apparent endothermic transition, at about 172° C. $Li_2S$ shows a steady state slight decline over the temperature range. The $Li_2S_w$—$Li_xP_yS_z$ compound shows two peaks, one at 182° C. which is associated with $Li_xP_yS_z$ and one at 200° C. which is associated with $Li_2S_w$.

FIG. 6B is the DSC showing the synthesis of the $Li_2S_w$—$Li_xP_yS_z$ compound using the one-step method. A method of manufacturing the positive electrode active material, the $Li_2S_w$—$Li_xP_yS_z$ compound, is described above with reference to FIGS. 1 and 2. First, the $Li_2S$, the solid electrolyte, $Li_3PS_4$, and sulfur were mortared, using the concentrations and time frames described above, and ball milled to produce the $Li_2S_w$—$Li_xP_yS_z$ compound. Next, 5 mg of the positive electrode active material was added to a stainless steel container for DSC, and the container was sealed. The sealed container was set in a DSC apparatus, and the measurement was conducted with a temperature rising speed of 5° C./min, and an end temperature of 300° C. The same steps were taken for the method components of the $Li_2S_w$—$Li_xP_yS_z$ compound, including $Li_3PS_4$, sulfur and $Li_2S$.

From the results of DSC, an endothermic and exothermic transitions, including an exothermic peak temperature, is graphed in FIG. 6B. $Li_3PS_4$ shows a single peak at 225° C. Sulfur shows a single downward peak, an apparent endothermic transition, at about 172° C. $Li_2S$ shows a steady state slight decline over the temperature range. The $Li_2S_w$—$Li_xP_yS_z$ compound shows two peaks, one at 172° C. which is associated with $Li_xP_yS_z$ and one at 215° C. which is associated with $Li_2S_w$.

Figure 7:
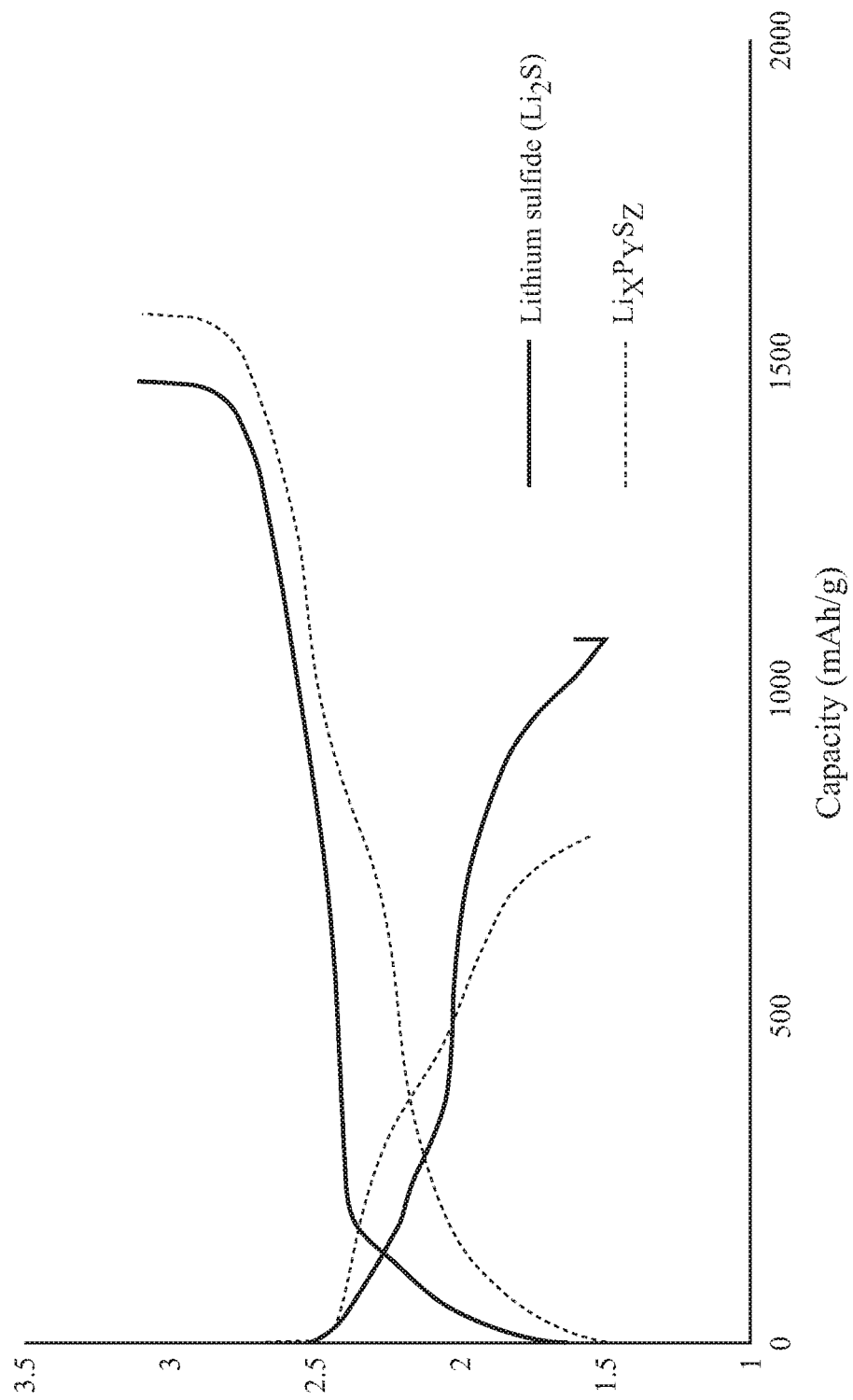
FIG. 7 is a graphical representation of galvanic charge and discharge for $Li_2S$ and $Li_xP_yS_z$, according to embodiments disclosed herein.

FIG. 7 depicts charge-discharge tests for $Li_2S$ and $Li_xP_yS_z$. Galvanic charge-discharge tests were conducted for the evaluation batteries produced using $Li_2S$ and the $Li_2S_w$—$Li_xP_yS_z$ composite, produced by the method described above. As representative examples of the obtained charge-discharge curve, the results of $Li_2S_w$—$Li_xP_yS_z$ compound, as formed by the two-step method described above, and $Li_2S$ are used here as the positive electrode active material of the respective electrochemical cell. The $Li_2S_w$—$Li_xP_yS_z$ electrochemical cell and the $Li_2S$ electrochemical cell were charged with a constant current at 25° C. The charge and discharge of the respective cells shows that both $Li_2S$ and $Li_xP_yS_z$ have electrochemical activity. Thus, the two cathodes can be charged and discharged as a cathode in solid-state batteries.

Figure 8:
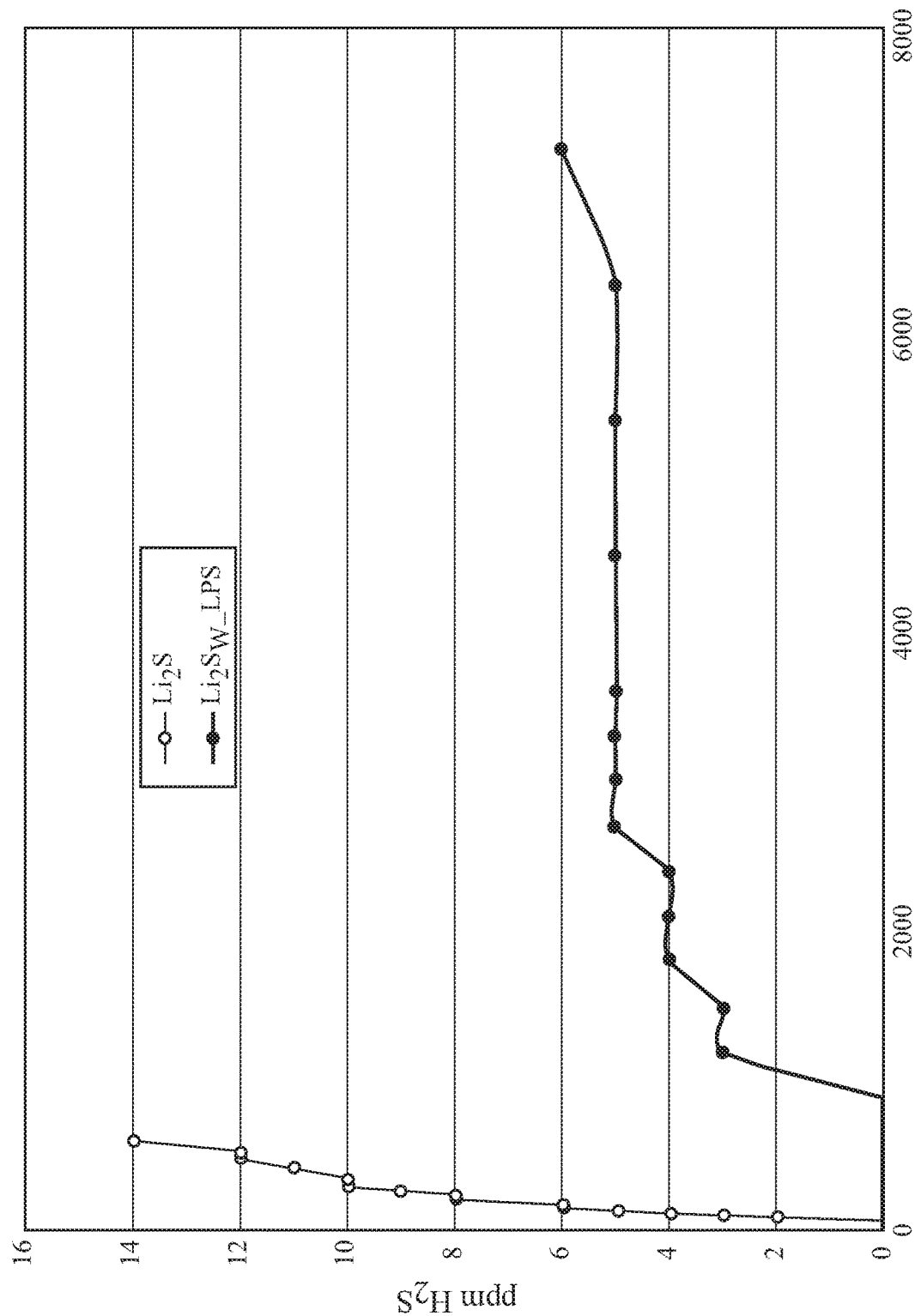
FIG. 8 is a graphical representation of $H_2S$ generation from the $Li_2S_w$—$Li_xP_yS_z$ composite, according to one embodiment.

FIG. 8 depicts $H_2S$ generation of the cathode powders used in charge-discharge tests above. Hydrogen sulfide is a toxic gas where safety in handling is a consideration. This can include the use of specialized and/or expensive equipment to control the environment of the battery fabrication method. However, if hydrogen sulfide generation can be reduced, the safety and manufacture costs of the lithium solid-state battery can be improved. Thus, this test was designed to determine the comparative production of $H_2S$ over time between $Li_2S$ and the $Li_2S_w$—$Li_xP_yS_z$ composite. $H_2S$ generation can be measured with gas detector in a controlled volume environment. One procedure can include placing a measured amount of sample into a sealable container. Then, the sample is exposed to the environment of the sealable container. $H_2S$ generation can then be measured with a gas detector and recorded as a function of time exposed. In one embodiment, from 10 mg to 500 mg of the tested composition can be placed into the controlled volume container. The container can then be sealed and with a fan switched on. $H_2S$ concentration can then be measured in ppm with a gas detector and recorded with time exposed. All positive electrode active materials may be tested in this manner for $H_2S$ generation.

In this example, $Li_2S$ and the $Li_2S_w$—$Li_xP_yS_z$ composite, 100 mg of each, was exposed to water in the presence of an $H_2S$ sensor. $H_2S$ is a decomposition product, which is known to be produced by lithium sulfide in the presence of water. A fan was positioned in proximity of the $Li_2S$ and the $Li_2S_w$—$Li_xP_yS_z$ composite, such that the decomposition gases were redirected toward the $H_2S$ sensor. $H_2S$ production was then measured as a function of time. As the graph shows, $Li_2S$ produced a significantly higher quantity of $H_2S$, than the $Li_2S_w$—$Li_xP_yS_z$ composite. The maximum production of $H_2S$ was measured 14 ppm after 600 seconds of exposure. As opposed to the significant $H_2S$ production from $Li_2S$ after 600 seconds, the $Li_2S_w$—$Li_xP_yS_z$ composite had no measurable production of $H_2S$ up to 1200 seconds. Further, the reduced overall production held true even over a comparatively extended period of time for the $Li_2S_w$—$Li_xP_yS_z$ composite. In this example, the $Li_2S_w$—$Li_xP_yS_z$ composite reached a maximum of 6 ppm after 7200 second. As such, the $Li_2S_w$—$Li_xP_yS_z$ composite shows improvements in the onset time of $H_2S$ generation and total amount of $H_2S$ generated.

EXAMPLES

Example 1

A lithium sulfide/solid electrolyte/lithium cell was fabricated as follows. First, 80 to 300 mg of lithium thiophosphate (undoped or halide-doped) was cold-pressed into a 1.128 cm diameter pellet using 0.5 to 10 tons of pressure. Then, 1 to 300 mg of a mixture of lithium sulfide, carbon and lithium thiophosphate (undoped or halide-doped) was spread atop the solid electrolyte pellet and the stack was pressed again with 0.1 to 6 tons of pressure. Additionally, the lithium thiophosphate could be doped with lithium salts such as $Li_3N$, $Li_3P$, $Li_2O$, $Li_3BO_3$, or $LiBH_4$. Finally, lithium foil was placed against the opposing side of the solid electrolyte, followed by copper foil to act as a current collector, and the stack was pressed at 0 to 4 tons of pressure.

Example 2

A lithium sulfide-lithium phosphorus sulfide composite/solid electrolyte/lithium cell was fabricated as follows. First, 80 mg to 300 mg of lithium thiophosphate (undoped or halide-doped) was cold-pressed into a 1.128 cm diameter pellet using 0.5 to 10 tons of pressure. Then, from 1 mg to 300 mg of a mixture of lithium sulfide, carbon and lithium halide-doped lithium thiophosphate was spread atop the solid electrolyte pellet and the stack was pressed again with from 0.1 ton to 6 tons of pressure. In further examples, the lithium thiophosphate was doped with lithium salts such as $Li_3N$, $Li_3P$, $Li_2O$, $Li_3BO_3$, or $LiBH_4$. Finally, lithium foil was placed against the opposing side of the solid electrolyte, followed by copper foil to act as a current collector, and the stack was pressed at 0 to 4 tons of pressure.

A $Li_2S_w$—$Li_xP_yS_z$ composite, electrochemical cells, and methods for making the same are described herein. It is shown herein that the composite is an electrochemically active cathode material. Further, it has been shown that the $Li_2S_w$—$Li_xP_yS_z$ composite shows increased resistance to decomposition and $H_2S$ generation than $Li_2S$. Suppressing $H_2S$ generation allows for processing of cathode materials in ambient air conditions. As such, this composite can be used with reduced costs and increased energy capacity over existing technologies Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The headings (such as "Background" and "Summary") and sub-headings used herein are intended for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A lithium sulfur-lithium phosphorus sulfur composite, comprising:
 a lithium sulfide material having an empirical formula of $Li_2S_w$, wherein w is from 2 to 20; and
 a lithium phosphorus sulfide material having an empirical formula of $Li_xP_yS_z$, wherein x is from 2 to 20, y is from 2 to 20, and z is from 2 to 20.

2. The lithium sulfur-lithium phosphorus sulfur composite of claim 1, further comprising atomic sulfur.

3. The lithium sulfur-lithium phosphorus sulfur composite of claim 1, further comprising a lithium salt dopant selected from the group consisting of $Li_3N$, $Li_3P$, $Li_2O$, $Li_3BO_3$, and $LiBH_4$.

4. The lithium sulfur-lithium phosphorus sulfur composite of claim 1, further comprising a lithium halide.

5. The lithium sulfur-lithium phosphorus sulfur composite of claim 1, further comprising carbon.

6. A lithium solid-state battery comprising:
 a positive electrode active material layer containing a positive electrode active material including a lithium sulfur-lithium phosphorus sulfur composite, comprising:
  a lithium sulfide material having an empirical formula of $Li_2S_w$, wherein w is from 2 to 20; and
  a lithium phosphorus sulfide material having an empirical formula of $Li_xP_yS_z$, wherein x is from 2 to 20, y is from 2 to 20, and z is from 2 to 20;
 a negative electrode active material layer containing a negative electrode active material; and
 a solid electrolyte layer disposed between the positive electrode active material layer and the negative electrode active material layer.

7. The lithium solid-state battery of claim 6, further comprising atomic sulfur.

8. The lithium solid-state battery of claim 6, wherein the positive electrode active material layer further comprises a lithium salt dopant selected from the group consisting of $Li_3N$, $Li_3P$, $Li_2O$, $Li_3BO_3$, and $LiBH_4$.

9. The lithium solid-state battery of claim 6, wherein the positive electrode active material layer further comprises a lithium halide.

10. The lithium solid-state battery of claim 6, wherein the positive electrode active material layer further comprises carbon.

11. The lithium solid-state battery of claim 6, wherein the solid electrolyte layer comprises a thiophosphate solid electrolyte material.

12. The lithium solid-state battery of claim 11, wherein the thiophosphate solid electrolyte material is $Li_3PS_4$.

13. The lithium solid-state battery of claim 6, wherein the negative electrode active material layer comprises a sulfide solid electrolyte material.

14. The lithium solid-state battery of claim 13, wherein the sulfide solid electrolyte material is $Li_3PS_4$.

15. A method for producing a positive electrode active material, the method comprising:
creating a lithium sulfur mixture by combining lithium sulfide and atomic sulfur;
mixing the lithium sulfur mixture by a mechanochemical process, the mechanochemical process producing a lithium sulfide material of formula $Li_2S_w$, wherein w is from 2 to 20;
adding a lithium phosphorus sulfur composition comprising $Li_3PS_4$, to the lithium sulfide material to create a lithium phosphorus sulfur mixture; and
mixing the lithium phosphorus sulfur mixture by a mechanochemical process, the mechanochemical process producing a composite comprising the lithium sulfide material and a lithium phosphorus sulfide material.

16. The method of claim 15, wherein mixing the lithium sulfur mixture or mixing the lithium phosphorus sulfur mixture includes ball milling for a period of 1 day to 7 days.

17. The method of claim 15, wherein the lithium phosphorus sulfide material has an empirical formula of $Li_xP_yS_z$, wherein x is from 2 to 20, y is from 2 to 20, and z is from 2 to 20.

18. The method of claim 15, wherein the lithium sulfur mixture further comprises a lithium salt dopant selected from the group consisting of $Li_3N$, $Li_3P$, $Li_2O$, $Li_3BO_3$, and $LiBH_4$.

* * * * *